United States Patent

[11] 3,622,960

| [72] | Inventors | Benjamin Barron<br>Malba;<br>Ernest Weiss, Plainview, both of N.Y. |
|---|---|---|
| [21] | Appl. No. | 832,925 |
| [22] | Filed | June 13, 1969 |
| [45] | Patented | Nov. 23, 1971 |
| [73] | Assignee | Lear Siegler, Inc.<br>Melville, N.Y. |

[54] SONAR TRANSMITTER SYSTEM
26 Claims, 9 Drawing Figs.

[52] U.S. Cl. .................................................... 340/3 R,
307/262, 323/101, 333/24 R, 340/5 R, 340/15
[51] Int. Cl. ...................................................... G01s 9/66
[50] Field of Search .......................................... 340/3, 3 A,
5, 8, 9, 10, 11, 12, 3 E, 15

[56] References Cited
UNITED STATES PATENTS

| 2,890,437 | 6/1959 | Dudley et al. | 340/3 E |
| 3,181,114 | 4/1965 | Hallmark | 340/3 E |
| 3,210,724 | 10/1965 | Jones et al. | 340/11 |
| 3,503,039 | 3/1970 | Aniskovics | 340/3 A |

Primary Examiner—Richard A. Farley
Attorney—Darby & Darby

ABSTRACT: A transmitter arrangement for a sonar active transmit-receive system in which the transducer is controlled to provide a wave front which is more coherent in phase and power by the use of a feedback control signal from the transducers. The transducers are also made to have a constant output impedance which is of a relatively low value.

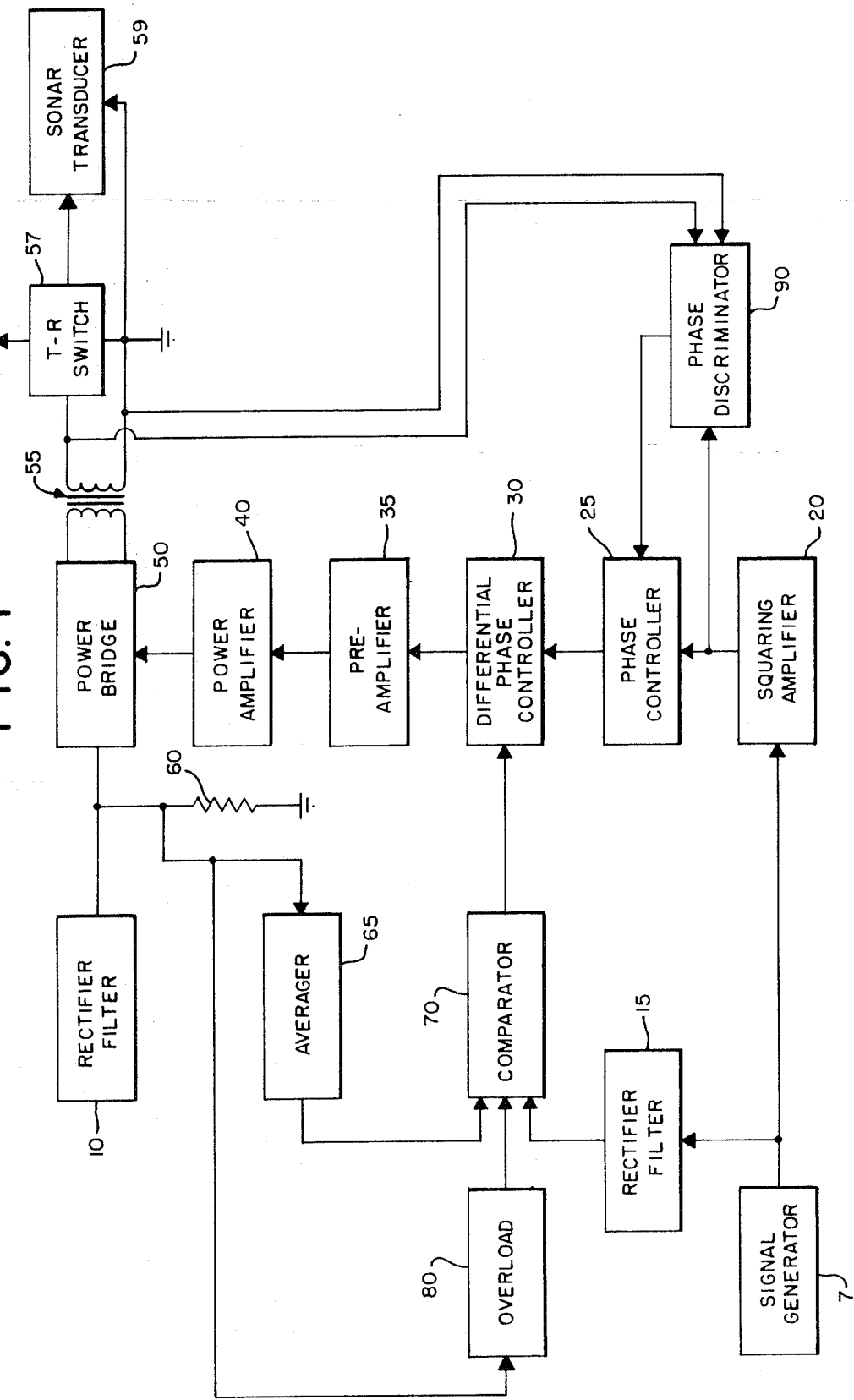

INVENTORS
BENJAMIN BARRON
ERNEST WEISS

BY *Darby & Darby*

ATTORNEYS

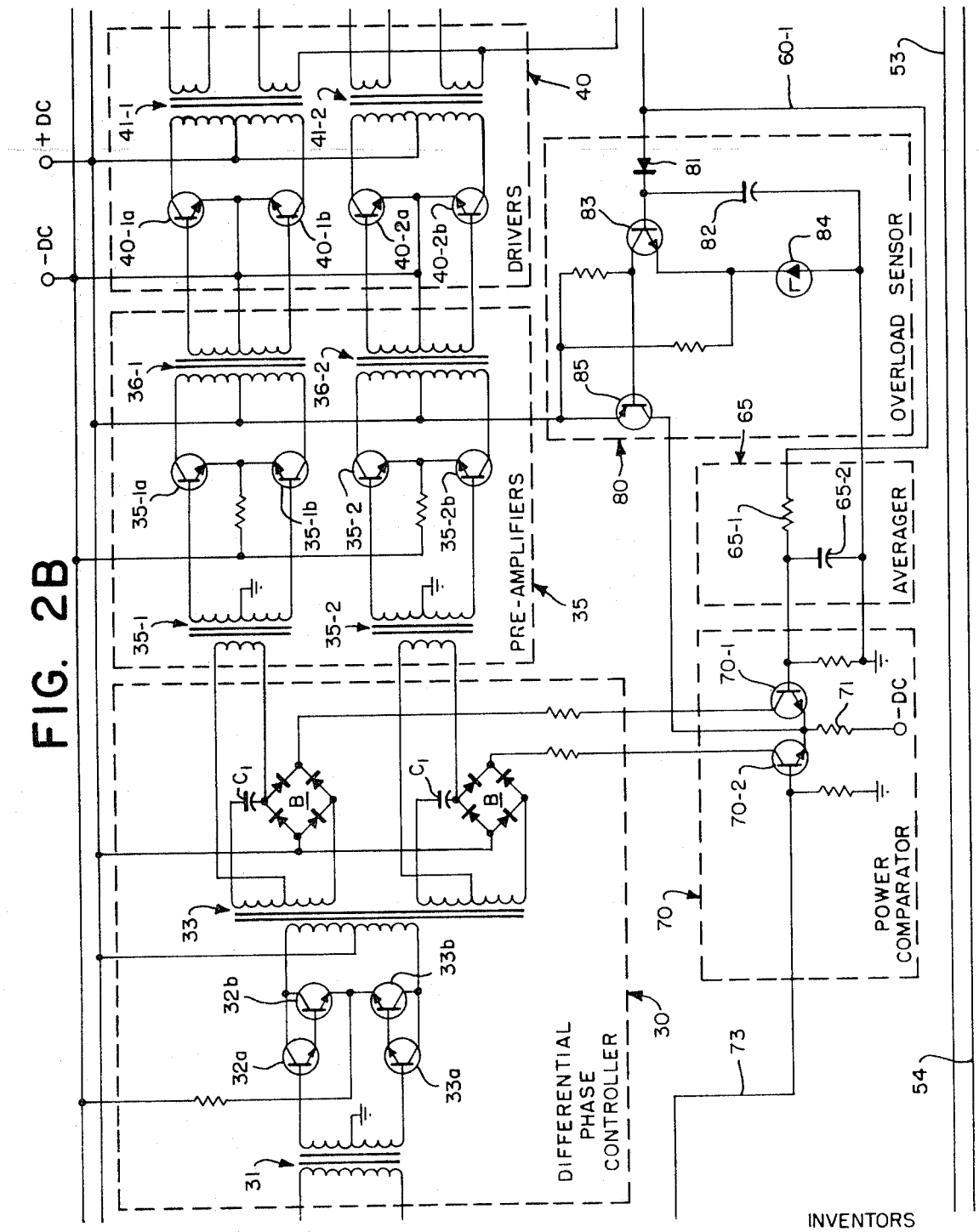

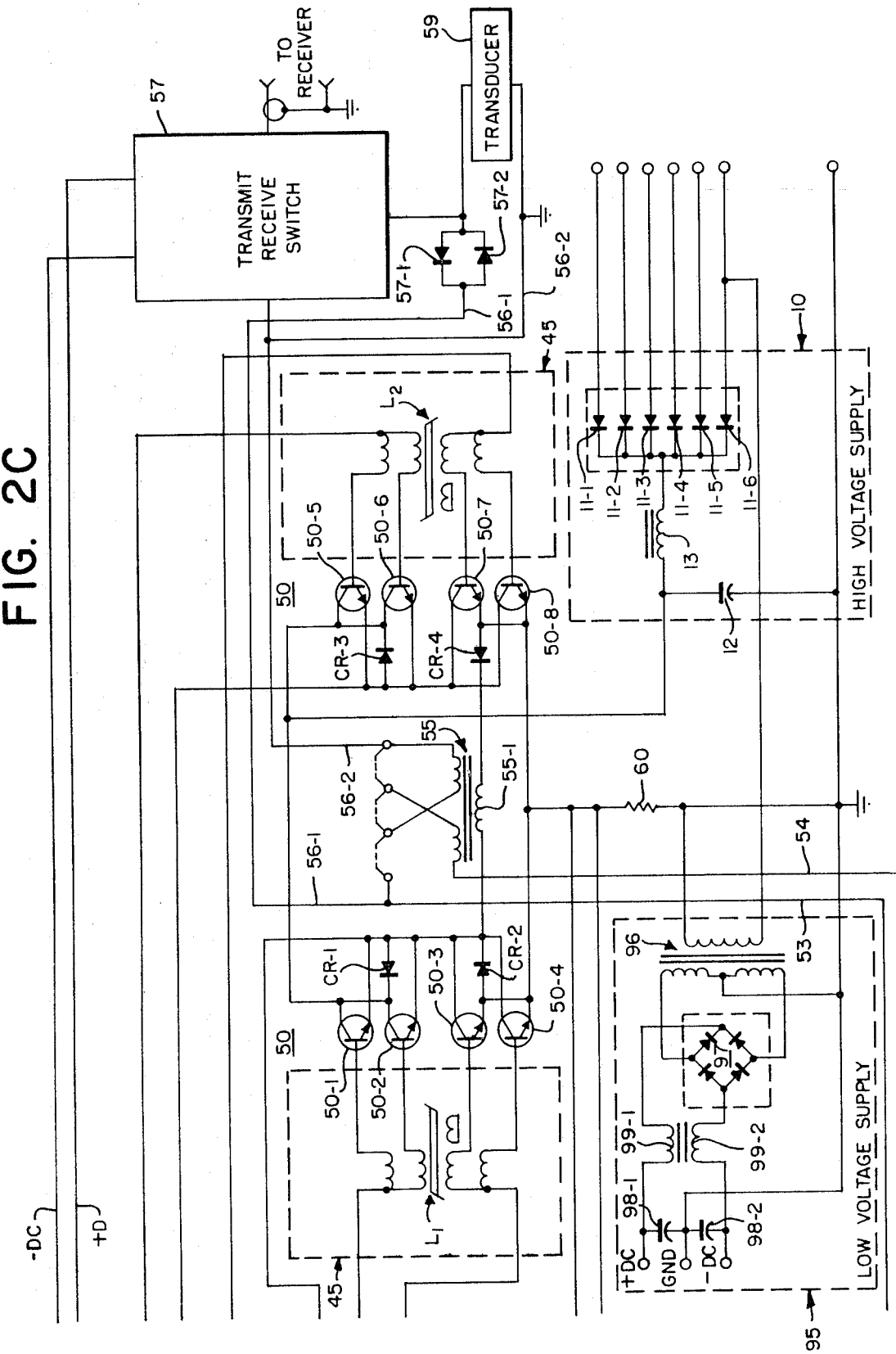

SONAR TRANSMITTER SYSTEM

Active-type sonar systems using a single transducer or an array of transducers are well known. In a typical system of this type a given transducer, or a small group of transducers, is controlled by a single electronic power generator. In a typical multielement transducer array, each element of the array, or a small number of elements, have their own respective power generators, which receive as an input a low-level control signal. The low-level control signal is amplified to produce the required power to operate the transducers. Each transducer, or group of transducers, and its associated power generator is called a transmitter.

It is well known that sonar-type transmitters are generally inefficient devices in their conversion of electric power into the sonic power transmitted into the water. It is also known that the output of a sonic wave front developed at the face of a transducer in the water often inaccurately follows the phase of the power signal applied to it from its generator. The inaccuracy in phase between the output sonic wave front and the power signal impressed on a transducer results in wide variations of the phase of the output sonic velocity wave with respect to the power signal input to the transducer. Further, the power amplitude of the sonic velocity wave varies widely relative to the amplitude of the input signal to the sonar transmitter.

The twin effects of phase and power variation of the transducer sonic wave in water relative to the input signal to the sonar transmitter are highly detrimental to the beam-forming capabilities of an array of sonar transducers from which it is desired that a sharply focused beam of sonic energy be produced. To further complicate the beam-forming problem, there are interactions between adjacent transducers within the array. The extent of these interactions depends, in large measure, upon the angle of the beam relative to the plane of the transducer array.

In many large, multielement sonar systems, the power requirements needed to produce a given type of sonic wave often amount to a large portion of the total power that is available from the central electrical power system aboard ship. Therefore, it becomes extremely desirable that the sonar power transmitters should have as high efficiencies as possible.

The foregoing problems are overcome in the subject invention by providing a sonar transmitter which is highly efficient. In accordance with the invention, a transmitter is provided in which the output power of the transmitter applied to the transducer is controlled in a manner to follow the amplitude of the input control signal. Further, the phase of the power supplied to the transformer is also controlled to minimize the effects of the impedance changes of the transducer due to a change in the frequency of the input control signal.

It is therefore an object of the present invention to provide a sonar transmitter that forces a transducer to produce sonic power into the water in a manner accurately to follow the frequency, phase and amplitude of the controlling input signal.

An additional object is to provide a sonar power conversion device (the transmitter) having a greatly improved efficiency.

Another object is to provide a sonar transmitter in which the power output is controlled in a manner determined by the input signal.

A further object is to provide a sonar transmitter system in which the magnitude and phase of the power supplied to the sonar transducer is compared with the input signal to the transmitter to control the power output of the system.

Other objects and advantages of the present invention will become more apparent upon reference to the following specification and annexed drawings, in which:

FIG. 1 is a schematic block diagram of the overall system;

FIGS. 2A, 2B and 2C when taken together with FIG. 2A vertical and FIGS. 2B and 2C horizontal comprise a schematic diagram showing circuit details of the system;

Figure 2A:
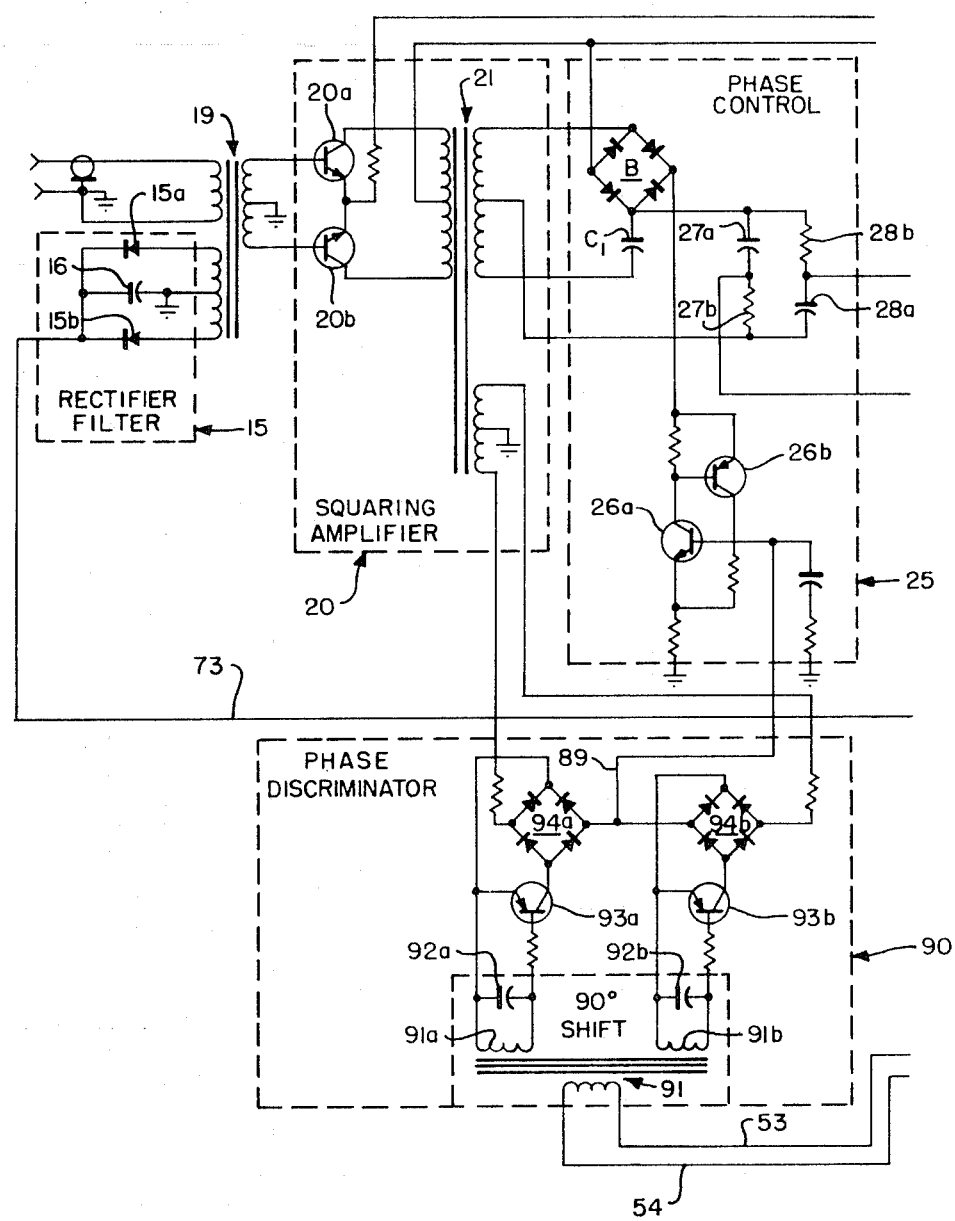

Referring now to the block diagram of FIG. 1, the system of the present invention is designed to operate from the ship's power supply which is, illustratively, six-phase 60-Hz. power. It should be understood that the description presented below applies to a transmitter for one sonic transducer or a relatively small group of transducers. For arrays of transducers, a number of identical transmitters of the same type shown in FIG. 1 are used all operating in common from the ship's power supply.

In FIG. 1, the ship's power is shown as being applied to a conventional rectifier filter circuit 10 whose output is high-voltage DC, for example in the order of 250 volts, at a relatively high power level. This high-voltage DC is applied to a power bridge circuit 50 which, as is described in detail below, is formed of power transistors. The power bridge circuit 50 feeds an output transformer 55 which in turn feeds a magnetic transmit-receive (TR) switch 57. The function of the TR switch 57 is to permit a single connected transducer 59 to function as both a transmitting and a receiving element without there being any interaction between in the system receiver circuits when the transducer is transmitting, and vice versa. One suitable form of TR switch is described in U.S. Pat. No. 3,414,872 of Benjamin Barron, dated Dec. 3, 1968, entitled "Magnetic Transmission Listen Switch For Sonar," which is assigned to the same assignee. The receiver of the complete sonar system is not shown in FIG. 1.

The power bridge 50 controls the character, power amplitude and phase of the energy supplied to the transducer 59. The bridge 50 is controlled by the control section portion of the system, which includes a number of components which are described below.

The control, or timing, signal for the system is provided by a signal generator 7 which can be of the fixed or variable type. In a typical application a variable frequency signal generator having an output frequency in the order from 2.0 to 10 kHz. is used to produce either an AC sinusoidal output or an output whose waveform is slightly squared in shape. The signal from generator 7 is supplied to a squaring amplifier circuit 20 where the signal is placed into a more square configuration for subsequent application to control the power transistor bridge 50. In general, the system operates to control the square wave output signals of circuit 20 in a manner to control the firing time, and thus the output power, of the bridge which supplies voltage to the sonar transducer. The phase of the square wave output signals from circuit 20 are also controlled to bring the sonic wavefront and the power applied to the transducer into phase.

To control the power applied to the bridge circuit 50, the control signal from generator 7 is also applied to a rectifier filter circuit 15 to produce a DC signal whose amplitude is proportional to the amplitude of the control signal from signal generator 7. A power-sensing resistor 60 is placed across the power transistor bridge 50 in a position to sense the DC power input to that bridge from the DC voltage supply 10. The resistor 60 is shown in a separate line in FIG. 1 for the sake of convenience. The voltage across the resistor 60 is filtered in an averaging circuit 65 to extract the DC component of the voltage.

The power input to the power transistor bridge 50 is given as $P_{in} = E_{DC} \times I_{DC}$. Since all transistors are used in the power transistor bridge the efficiency of the conversion action of the bridge is very high, in the order of 98 percent or slightly greater. Therefore, the output power of the bridge is very nearly equal to the input power ($P_{out} \cong P_{in}$). It therefore follows that for fixed values of DC input voltage to the power transistor bridge 50, the DC (or average) value of the input current to the bridge is a measure of the AC power being delivered to the transducer 59. The power-sensing resistor 60 is connected to produce a voltage drop across it which is proportionate to the current flowing into the bridge.

The output power of the transistor bridge 50 applied to the transducer 59 has an AC component due to the bridge switching action. The "real" (DC) component of the transducer AC input current is proportional to the voltage measured across the power sensing resistor 60 since this voltage is proportional to the power input to the bridge 50 which in turn is approximately equal to the power output of the bridge supplied to the transducer. If the transducer losses are assumed to be small, then the average voltage measured across the power-sensing resistor 60 is approximately proportional to the power being radiated by the transducers into the water.

The voltage sensed by resistor 60 and averaged in circuit 65 is applied to a power comparator circuit 70 where its amplitude is compared to the amplitude of control signal from the signal generator 7. The differential output of the comparator 70 operates a differential phase controller circuit 30 which is located between the squaring amplifier 7 and the bridge 50. The differential controller 35 operates to control the width of the square wave pulses from squaring amplifier 20 applied to the bridge 50. By controlling the pulse width through preamplifier and power amplifier circuits to the bridge input, the output power of the system is controlled. By this arrangement the transmitter automatically compensates for variations in transducer power transfer into the water when subjected to variances due to changes in carrier frequency, internal mechanical resonances and power feedback due to outputs from other transducers in an array. The feedback action forces the insonification power of the water to follow the command of the input signal to the transmitter.

To compensate for the wide variations of impedance of the transducer 59, which occur due to changes in frequency of the control signal, a phase-locking system is also included. The phase-locking system includes a phase discriminator circuit 90 which receives as one input signal the output of the power bridge 50 taken across the secondary winding of the transformer 57. The other input to the phase discriminator 90 is from the output of the squaring amplifier 20. The two signals are compared and an error signal is produced which is used to operate a phase controller circuit 25 to shift phase of the control signal from the squaring amplifier 20 into the power bridge 50. The phase is automatically adjusted so that the phase difference between the input signal from the generator 7 and the output current of the power bridge is minimized and maintained at a low value independent of variations of input admittance of the transducer.

An overload circuit 80 is also provided to sense the power in the bridge input across the resistor 60. When an overload is sensed, the circuit 80 operates the comparator 70 to supply a signal to the differential phase controller 30 which reduces the signal to the bridge 50 to effectively zero pulse width. This effectively removes input control from the power bridge 50 and shuts down the system.

Referring to FIGS. 2A, 2B and 2C, which is a detailed schematic of the system of FIG. 1, the high-voltage supply system 10 is shown in the lower right-hand corner of FIG. 2C and includes six lines coming from the respective six phases of the ship's input power to a respective half-wave rectifier 11-1 through 11-6. The outputs (cathodes) of the rectifier are all connected in common and the output voltage is filtered by a capacitor-choke combination 12-13. Of course, the transmitter is not dependent upon a power system having a particular number of phases.

One of the phases of ship's supply power is applied to the primary winding of a transformer 96 of a low-voltage power supply circuit 95 (FIG. 2C). The secondary of transformer 96 is connected to a full wave bridge rectifier 97. The output of the bridge rectifier is applied through a dual choke and capacitor arrangement 98-1, 99-1 and 98-2, 99-2 to provide positive and negative DC voltage for the various control portions of the system.

The input control signal for the transmitter from the variable frequency generator (not shown in FIG. 2A) is supplied to the primary winding of a transformer 19 from where it is coupled into a split secondary winding whose ends supply the control signal to the base electrodes of two transistors 20a and 20b of the squaring amplifier 20. Transistors 20a and 20b are high-gain amplifiers and the control signal is of sufficient magnitude to drive the amplifiers into saturation and thereby produce output square waves that are fixed in amplitude and precisely in phase with the input signal.

The control signal from the generator is also coupled from the primary winding of transformer 19 to another, lower, winding on the primary side which is the input of the rectifier-filter circuit 15. Circuit 15 includes a full wave rectifier formed by the diodes 15a and 15b and a filter capacitor 16. The output of circuit 15 is a DC signal that is proportional to the amplitude of the input signal from the generator. This output signal is applied to the power comparator circuit 70 over line 73 for controlling the pulse width of the input signals to bridge circuit 50 and thereby the total output power of the system.

FIG. 2C shows the bridge circuit 50 which is formed by eight power transistors which are respectfully designated 50-1 through 50-8. These transistors are connected in what is effectively a bridge circuit with the primary winding 55-1 of the transformer 55 as the load. The secondary winding of transformer 55 is of the variable tap type to control an output current which is applied over lines 56-1 and 56-2 to the transducer 59. The transmit-receive switch 57 is across lines 56-1 and 56-2. This switch is separately controlled in a conventional manner, for example as described in the aforesaid U.S. Pat. No. 3,414,872. Line 56-2 is connected to ground and a pair of parallel-connected, oppositely poled diodes 57-1 and 57-2 are connected in series in the high-side line 56-1 to clip transient current pulses applied from the bridge to the transducer 59 which is also connected across lines 56-1 to 56-2. The T-R switch 57 operates to prevent signals produced by the transducer 59 during reception mode of operation from reaching the transmitter circuitry and to prevent transmitted power from reaching the receiver during the transmission mode of operation. This is described in the aforesaid patent.

Considering now the power bridge circuit in detail, the eight transistors are connected in a bridge circuit in four pairs 50-1, 50-2; 50-3, 50-4; 50-5, 50-6 and 50-7, 50-8. The two transistors of each pair are effectively connected in parallel, for example, as shown in transistor 50-1 and 50-2 the two collectors and the two emitters are tied together. The same holds true with the other three pairs of transistors.

The base electrodes of the transistor pair 50-1, 50-2 receive control signals from the upper secondary winding of a transformer 41-2 which is part of the driver circuit 40, whose details are described below. Similarly, the base electrodes of transistor pair 50-3 and 50-4 receive signals from the lower secondary winding of the same transformer 41-2 while the two transistor pairs 50-5, 50-6 and 50-7, 50-8 are respectively supplied signals from the upper and lower secondary windings of a transformer 41-1. These signals are applied through anticross conduction circuits 45 which are described in detail below.

The driver circuit 40 operates to provide four output signals, one for each of the four secondary windings of the two transformers 41-1, 41-2. At any given time, the signals at the ends of two of these windings connected to the base electrodes of switching transistors 50 will be positive, so as to fire the two connected transistor pairs, while the output signals of the other two secondary windings will be negative so that the respectively connected transistor pairs will be off.

A truth table is set forth below, showing the respective firing of the various transistors of the power bridge. It should be understood that the signals in the four secondary windings of the transformers 41 are positive for two 90° segments of a complete 360° cycle and negative for the other two 90° segments. The 360° cycle is shown below divided into four time zones A, B, C and D. The 1 represents a transistor pair being on (fired) and a 0 represents it being off:

| Time Zone | Switch Condition | | | |
|---|---|---|---|---|
| | 50-1,50-2 | 50-5,50-6 | 50-7,50-8 | 50-3,50-4 |
| A | 1 | 0 | 1 | 0 |
| B | 1 | 1 | 0 | 0 |
| C | 0 | 1 | 0 | 1 |
| D | 0 | 0 | 1 | 1 |

Figure 3:
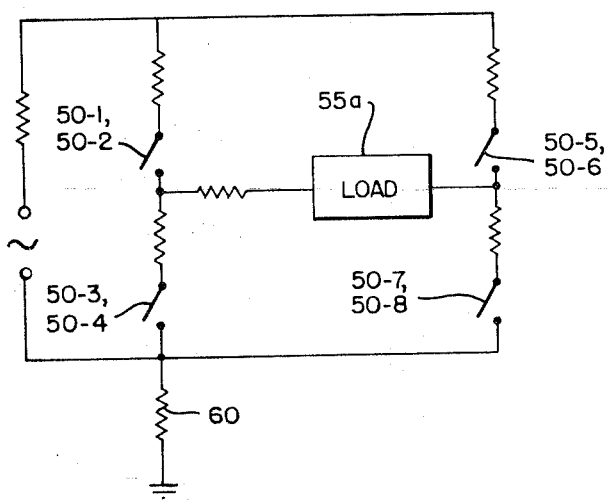
FIG. 3 is a simplified diagram showing the operation of the bridge-switching circuit.

FIG. 3 is an equivalent circuit diagram of the power bridge in which the various transistor pairs are each represented by a switch. The resistance connected in series with each switch corresponds to the saturation resistance of the transistors. This resistance is relatively low since two transistors are connected in parallel.

As should be apparent from an analysis of the complete circuit in FIG. 2C, in which there is a collector-to-emitter connection of the two pairs 50-1, 50-2 and 50-3, 50-4 and the same type of connection for the two pairs 50-5, 50-6 and 50-7, 50-8, the switching transistors form a bridge. The primary winding 55-1 of the output transformer is connected between the collector-emitter junctions of the two pairs of transistors on each side of the bridge. The winding resistance of the primary winding 55-1 is represented as a resistance in FIG. 3 and the block 55a designated "load" corresponds to the load reflected into the primary winding. The power source and the source resistance are shown connected across the bridge of FIG. 3.

Referring to the truth table given above, the sequence of switching operation is shown. It should be noted that two pairs of transistors are always on. When, for example, the two pairs 50-1, 50-2 and 50-7, 50-8 are on, current will flow from the source through transformer 55. Current flows in the reverse direction through the transformer when pairs 50-5, 50-6 and 50-3, 50-4 are on. As seen above, current flows during the time zones B and D. When the other combination of two pairs are on, that is, 50-1, 50-2 and 50-5, 50-6 or 50-3, 50-4 and 50-7, 50-8, no current flows through the transformer 55. This occurs during time zones A and C.

Since two pairs of transistors are always on, the output impedance of the power switching bridge is kept to a low value independent of the switching angles. This impedance is equal to the saturation resistance of the on pair of transistors, the winding resistance of the output transformer plus the power source resistance. In actual practice, the saturation resistance of the transistors and the power source resistance is much smaller than the winding resistance of the transformer. Therefore, the effective output impedance of the transmitter, which the transistor 59 sees, is that of the output transformer 55 only.

Figure 4:
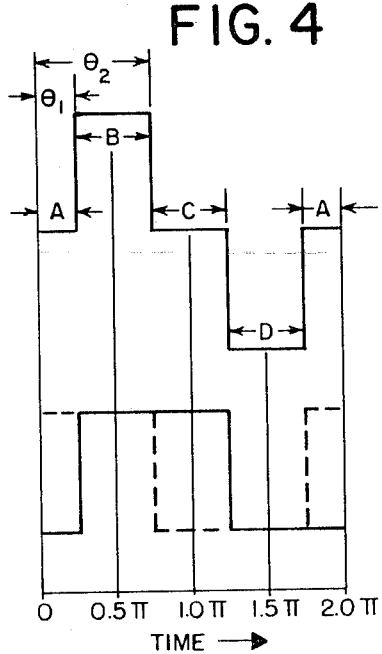
FIG. 4 is a diagram showing the waveforms of the switching circuit.

Referring now to FIG. 4, the lower diagram shows the waveform (in solid lines) of the control signal applied to the two pairs of transistors 50-5, 50-6 and 50-7, 50-8 while the dotted line shows the input signal applied to the other two pairs of transistors. As should be apparent from FIG. 4, current flows in the bridge only during the times when the solid and dotted line waveforms overlap, that is, during time zones B and D. By controlling the phase of the signals used to energize the transistor pairs of bridge circuit, the firing angle $\theta_1$ of the bridge circuit with relation to the beginning of a complete cycle can be controlled as well as the time during which current flows. This time is $\theta_2 - \theta_1$ and it determines the output power of the bridge which is applied to the transducer 59.

As shown in FIG. 2C, the sensing resistor 60 is connected between the parallel-connected emitters of the two switching power transistors 50-4 and 50-8 and ground. Since a portion of the current switched by the bridge into the transformer 55 flows through resistor 60 a voltage drop is produced across the resistor which is proportionate to the input current to the bridge 50. This voltage is applied over line 60-1 to averaging circuit 65 which is effectively a low-pass filter formed by a resistor 65-1 and a capacitor 65-2. The output of the averaging circuit, which is a varying DC voltage, is applied to the base electrode of a transistor 70-1 which operates with a second transistor 70-2 as a differential amplifier circuit. The transistors 70-1 and 70-2 have a common emitter resistor 71 and the input to the base of transistor 70-2 is the DC component of the input control signal voltage from the rectifier filter circuit 15 applied over line 73.

The differential amplifier circuit 70-1 and 70-2 is such that the base drive voltage causes equal and opposite changes in the collector currents of the two transistors. The collector currents vary in magnitude depending upon whether or not the power sensed by the resistor 60 (signal applied to base of 70-1) is greater or less than the power to be produced by the system in response to the control signal (signal applied to base of 70-2). The collector current of each transistor controls the operation of a separate phase shifter of the differential phase controller 30. Therefore, the shifts occurring in the respective phase shifter circuits are equal and opposite. The phase-shifted output signals of controller 30 determine the width ("on" time) of the output pulses from the bridge 50 in the manner described with respect to FIGS. 3 and 4. The pulse width is adjusted accordingly to maintain the desired power output in response to the error signals produced by the amplifier 70-1 and 70-2.

As indicated above, because of the wide variations of transducer impedance with frequency, which occurs due to the frequency of the signal from the generator 7 being purposely changed to meet a specific application, a phase-locking system is included in the system. The current in the secondary of the output transformer 55 of the bridge circuit is supplied over lines 53 and 54 to the primary winding of a current transformer 91 in the phase discriminator circuit 90. The transformer 91 has two secondary windings 91a and 91b. A respective capacitor 92a and 92d is connected across each secondary winding to produce a voltage that is in phase quadrature with the current flowing in the windings. The 90° phase-shifted signals across the capacitors 92 switch a respective pair of switching transistors 93a and 93b in quadrature with the output current applied to the sonar transducer 59.

The two transistors 93a and 93b are powered by the squared input control signal from the squaring amplifier 20 taken off across a second, lower, center tapped secondary winding of transformer 21. Each end of this winding is connected through a resistor to one junction of a respective full wave bridge rectifier circuit 94a and 94b. The two bridges have a common junction to which is connected an output lead 89. The collector and emitter of transistors 93a and 93 b are connected across the other two junctions of the respective bridges 94a, 94b to produce a conventional phase discriminator circuit.

If the current flowing in the output transformer 55 is not in phase with the input control signal, an error signal of a magnitude corresponding to the phase error is produced by the phase discriminator. This error signal appears on line 89 and is applied to the base electrode of a transistor amplifier 26a whose collector is connected to the base of another transistor amplifier 26b. The two transistors 26a and 26b are connected in cascade to amplify the phase error. The phase error signal operates a phase shifter circuit in the phase control section 25 of the system.

Figure 5A:
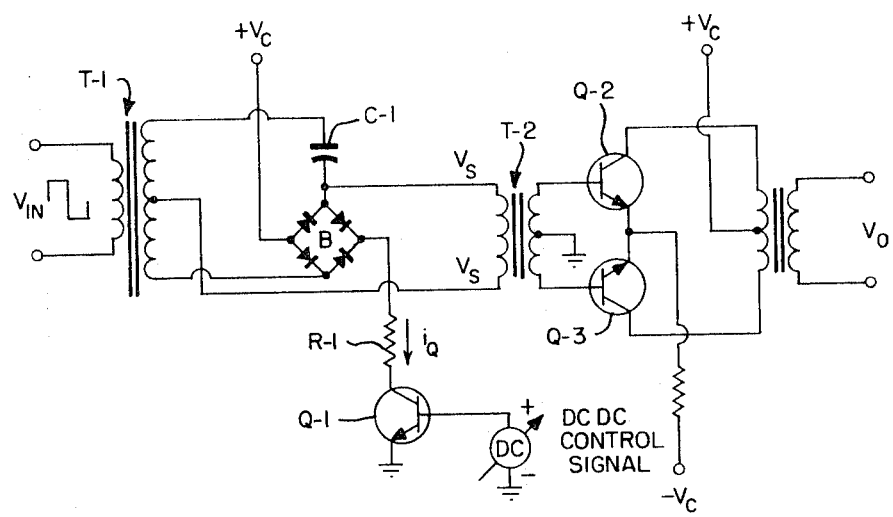
FIG. 5A is a schematic diagram illustrating the details of a phase shift circuit used with the invention.
Figure 5B:
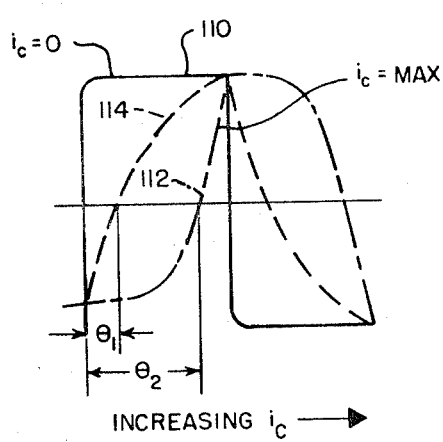
FIGS. 5B and 5C are diagrams illustrating the operation of the phase shift circuit of FIG. 5A.
Figure 5C:
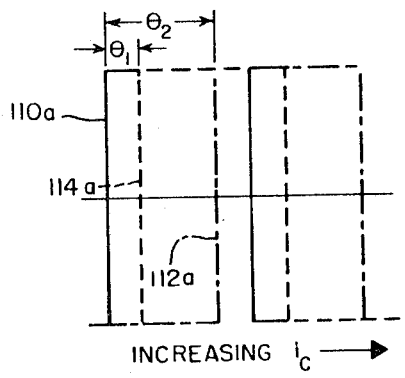

FIGS. 5A, 5B and 5C illustrate in greater detail the phase shift circuits used in both the phase control section 25 and the differential phase controller 30. In describing the operation of the phase shifter circuit of FIG. 5A, it is considered that a square wave input signal $V_{in}$ is applied to the primary winding of a transformer T-1 which has a center tapped secondary winding. The upper end of the secondary winding is connected to one end of a capacitor C-1 whose lower end is connected to the upper junction of a bridge-type rectifier B. The lower end of the secondary winding is connected to the lower junction of the rectifier B. The left junction of rectifier B is connected to the positive voltage source $V_C$ while the right junction is connected to the output collector electrode of a transistor $Q_1$ through a resistor $R_1$ through which a current $i_Q$ flows. The conduction of transistor $Q_1$ is controlled by a DC control signal in the base electrode. The primary winding of a transformer T-2 is connected between the upper junction of the rectifier B and the center tap of the secondary of transformer T-1 and a voltage $V_S$ is developed across it. The secondary winding of transformer T-2 has a center tapped secondary and the ends of this winding feed the base electrodes of two high-gain transistor amplifiers Q-2 and Q-3. These amplifiers saturate rapidly in response to small base drive signal voltages.

Considering the operation of the phase of shifter of FIG. 5A, the collector voltage of transistor Q-1, which is controlled by the DC control signal, biases the connection points of the various diodes of the rectifier bridge B. Thus, the conduction condition of transistor Q-1 determines at what amplitude of the signals from T-1 the diodes of bridge B will conduct to change the capacitor C-1. By this arrangement, C-1 has a controllable charging current.

FIG. 5B, shows the waveform $V_S$ across the primary of transformer T-2 for various capacitor currents. Curve 110 shows $V_S$ in response to zero charging current for C-1 resulting in $V_{in}$ essentially appearing across the primary of T-2 as $V_S$. This occurs when the bias from transistor Q-1 is such that there is no conduction of the diodes of the bridge B. Curve 112 shows $V_S$ for maximum charging current in capacitor C-1. This occurs when there is no prebias from the transistor Q-1 and the diodes of B conduct for the full cycle of $V_{in}$. Curve 114 shows an intermediate value of $V_S$ in response to an intermediate value of charging current, that is, when the diodes of B are prebiased by same amount. Any value of $V_S$ between the two extremes of curves 110 and 112 can be obtained by adjusting the DC control signal.

Since the transistors Q-2 and Q-3 are high-gain amplifiers, their conduction is determined effectively by the zero crossover points of the waveform $V_S$. As $V_S$ goes positive, the respective amplifier Q-2 or Q-3 receiving the base drive signal from the secondary of T-2 begins to conduct and the other transistor is cut off. The resultant output wave form appearing across the primary winding of a transformer T-3 is the output voltage $V_O$. This is shown in FIG. 5C. The output waveform $V_O$ produced in response to zero charging current for the capacitor C-1 is shown by the solid line 110a; the $V_O$ waveform produced in response to the maximum charging current is shown by the waveform 112a; and the intermediate value of charging current by waveform 114a. As should be apparent, by suitably adjusting the DC control signal, the phase of the output waveform $V_O$ can be controlled.

Referring now to FIG. 2A, the phase shifter circuit in the phase control section 25 is similar to that described with respect to FIG. 5 and comprises the transformer 21 of the squaring amplifier, which supplies a square-wave-type input signal to the bridge rectifier B. The capacitor C-1 is also shown and the control signal corresponding to the input to transistor Q-1 of FIG. 5A is provided by the phase discriminator circuit 90 which controls the two transistors 26a and 26b, these transistors corresponding to transistor Q-1 of FIG. 5A.

The primary winding of transformer 31, which corresponds to transformer T-2 of FIG. 5A, is connected somewhat differently in that its ends are respectively connected to the junctions of two series-connected pairs of resistor and capacitor networks 27a, 27b and 28a, 28b. The purpose of this is to provide 90°-bias phase shift $V_S$ waveform. The secondary winding of transformer 31 has its ends connected to base electrodes of two transistors 32a and 33a. These correspond to the transistors Q-2 and Q-3 of FIG. 3A. These two transistors 32a and 33a are in turn connected in Darlington-type amplifier circuits with transistors 32b and 33b. The outputs of the two transistor amplifier circuits 32 and 33 are applied to the ends of the primary winding of a transformer 33. This corresponds to T-3 of FIG. 5A.

As should be apparent, the output signal produced by amplifiers 32 and 33 across transformer 33 is a square wave. The phase of this signal is locked to the phase of the signal applied to the transducer 59 due to the error signal produced by the phase discriminator 90 which operates the variable phase shifter of the phase control section 25.

The signal at the primary winding of transformer 33, which is locked in phase to the transducer signal, is coupled into two secondary windings of the transformer in the differential phase control section 30. Each secondary winding of transformer 33 is connected across the bridge rectifier of a respective phase shifter circuit of the type previously described with respect to FIG. 5A. The signals for the two phase shifters, corresponding to the DC control signal of FIG. 5A are, in this case, the output voltage produced across the power sensor resistor 60 and the rectified input voltage signal on line 73. These two signals control the collector currents in the differential amplifier formed by the two transistors 70-1 and 70-2. Transistor 70-1 supplies the prebiasing signal for rectifier bridge B of the upper phase shifter and transistor 70-2 supplies the prebiasing signal for the rectifier bridge B of the lower phase shifter.

The output signals of the two phase shifter circuits of the differential phase controller 30, one of which is in phase and the other which is 180° out of phase from the signal at the primary of transformer 33, are applied across the primary windings of respective transformers 35-1 and 35-2. These signals correspond to the $V_S$ signals of FIG. 5B. Each transformer 35 has a center tapped secondary winding whose ends are connected to the base electrodes of a respective pair of high-gain transistor amplifiers 35-1a, 35-1b and 35-2a, 35-2b. Transistors 35 preamplify the signals to control the power bridge 50. Each pair of these transistors 35 corresponds to Q-2 and Q-3 of the phase shifter of FIG. 5A. The square wave output signals of the two transistor pairs 35-1a, 35-1b and 35-2a, 35-2b are applied to the primaries of respective transformers 36-1 and 36-2. These two signals each have a controllable phase in accordance with the control signals produced by the differential amplifier of the power comparator 70.

Tee secondary windings of the transformers 36-1 and 36-2 are center tapped and the ends are connected to the base electrodes of respective driver amplifier pairs 40-1a, 40-1b and 40-2a, 40-2b. The outputs of the driver transistors are connected across the center tapped primary windings of respective transformers 41-1 and 41-2. Each of the transformers 41 has two secondary windings which are connected to the base electrodes of the bridge switching transistors in the manner previously described. As should be apparent, the single control signal from generator 7 is converted into four signals at the drivers 40. These signals have the phases shown in the truth table to fire the switches. The outputs of the driver amplifiers 40 which magnify the power of the preamplifiers 35 are used to control the switching transistors 50-1 through 50-8.

As described with respect to FIG. 3, the total "on" time of the bridge 50 during which current is supplied to transformer 55, is controlled by the overlapping areas $(\theta_1-\theta_2)$ of the firing of transistor pairs in opposite diagonals of the power bridge. By controlling the phase shifts produced by the two shifters of the phase controller 30, the overlap areas are set. This is done in response to the error signal produced by the differential amplifier of the comparator 70. Thus, the power output of the bridge tracks the level set by the input control signal. The initiation of an output pulse of current from bridge 50 at $\theta_1$ is set by the error signal from the phase discriminator 90. Thus, the power output of the bridge tracks the transducer.

It is important that no phase shift in the output waveform of the bridge 50 be introduced when the total "on" pulse width is varied. This results in the need to isolate the phase control loop from the power control loop of the system to prevent interaction between them. Isolation provided by the differential phase controller 30. The differential amplifier pair 70-1, 70-2 are coupled through the common emitter-resistor 71 and the circuit is such that the base drive voltage applied to either transistor causes equal and opposite changes in collector current in the two transistors. Therefore, the phase shifts occurring in their respectively connected phase shifter circuits are equal and opposite. The total current in the differential transistor pair is constant. The value of the common emitter-resistor 71 is such that for no signal difference in the collectors the phase shift produced by each half of the differential phase control is 90°. At that condition, the square waves in each transistor pair will be equal and opposite and the pulse width output wave becomes zero.

The difference between the two signals applied to the base electrodes of transistors 70-1 and 70-2 is normally kept small by the amplifying action of the differential transistor pair which acts continuously to cause the power output to track the control signal amplitude. Since the variation of phase is symmetrical for each phase shifter of the controller 30, there is little variation of the center of the output wave as the power level is varied and thus the power and phase controls are also isolated from each other.

The switching efficiency of the power-switching transistors, 50-1 through 50-8 is enhanced by the action of the nonlinear coupling inductors L1 and L2 that are part of the anticross conduction circuits 45. As shown, each of the inductors $L_1$ and $L_2$ has four windings. One end of each of two of the windings is connected to an end of a secondary of a transformer 41-1 or 41-2 and the other end of each of these inductor windings is connected to the base electrode of a switching transistor 50. inductors two pairs of windings of each of the inductors $L_1$ and $L_2$ are oppositely polarized so that the base drive signals that are produced by the driver transformers 41-1 and 41-2 are delayed by the time required to saturate the coupling inductors. The small increment of time allows the transistor pair that was on previously to turn off completely before the opposite transistor pair is allowed to come on. This action is essential since the turn-on time for power transistors is usually much greater than the turnoff time. If the anticross conduction circuits 45 were not included, simultaneous conduction in two transistor pairs would occur during the reversal time of the input square wave. The losses would then be:

$P_o = (t/T \times BI_o \times E_{DC})$ where $t = t_{off} - t_{on}$
$T = 1/2f$
$B$ = transistor gain
$E_{DC}$ = high-voltage supply.

The delay introduced by the saturating inductors $L_1$ and $L_2$ insures that $t$ is zero and thus eliminates the cross-conduction losses.

Protection for overload or short-circuited output is provided by the overload sensor 80. The absolute level of voltage across the sensing resistor is developed by a peak rectifier formed by a diode 81 and a capacitor 82. This voltage is applied to the base electrode of a transistor 83 and if it exceeds the emitter bias set by a zener diode 84, transistor 83 turns on also causing a connected transistor 85 to conduct. The output of transistor 85 is applied directly into the common emitter-resistor 71 of the power control differential transistors 70-1 and 70-2. The injected voltage off-biases both transistors forcing the square wave outputs of each half of the differential phase controller 30 to coincide exactly. This action causes the output pulse width wave of the power bridge 50 to disappear and thus decouple the overload from the system. The peak current flowing in the power-sensing resistor 60 maintains the system in the off condition until the fault is removed. At that time, the system automatically returns to normal operating condition.

In the event two or more transducers are close to each other, acoustic energy from the operating transducer (s), as a result of reverberation and sidelobes, tends to reflect energy into adjacent operating transducers. The reflected energy received in a transducer, called $P_r$ is transformed into reverse current, called $I_r$, and is at an angle in a respective transducer such that the resultant vector of the transmitted power and received power from another transducer is a magnitude K. In the event the absolute power $|P|$ at the transducer (s) is greater than that of the input reference, power will be reduced due to the action of the differential controller 30. In the event the reflected power $P_r$ is of such magnitude that the reduction of the output power is insufficient for complete compensation, reversal of the DC control signals into the base electrodes of the two transistors 70-1 and 70-2 of the differential pair results. Reversal of the DC control signals in these two transistors causes the differential phase shifter to produce phase shifts that result in reversed phasing of the pulse width output wave of bridge 50. This makes the power delivered to the load 180° out of phase with the input control signal thereby cancelling the effect of the reflected power.

In the event the reflected energy is of such magnitude that it exceeds the power-handling capabilities of the transmitter, the excessive incoming energy is rectified through diodes $CR^1$, $CR^2$, $CR^3$ and $CR^{14}$ and is stored in the capacitor 12 in the high-voltage supply 10. This storage converts this normally destructive reverse energy into power for use during the next pulsing cycle.

What is claimed is:

1. A sonar transmitter comprising transducer means, means for producing a control signal representative of a quantity of power to be supplied to said transducer means,
   means responsive to said control signal to supply power to said transducer,
   and control circuit means responsive to the amount of power supplied to said transducer and to said control signal to control said power supply means to adjust the amount of power supplied to said transducer means.

2. The transmitter of claim 1 in which the control circuit means is responsive to the amplitude of the control signal.

3. The transmitter of claim 1 in which said power supply means includes means for producing a variable duration pulse of current, said control circuit means including means to control the duration of said pulse to adjust the power supplied to said transducer.

4. The transmitter of claim 3 wherein said variable duration current pulse-producing means includes a plurality of switching means, said means for controlling the duration of the current pulse comprises means for controlling the current conduction time of selected ones of said switching means.

5. The combination of claim 4 wherein said means for controlling the current conduction time of said switching means comprises first means responsive to said control signal for supplying a pair of signals to a selected pair of said switching means to produce a current pulse for the transducer, said first means including phase shifter means to shift the phase of said pair of signals relative to each other to control the duration of the conduction time of said selected pair of switching means.

6. The transmitter of claim 3 wherein the means responsive to the amount of power supplied to said transducer comprises means responsive to the current produced by said power supply means to produce a voltage of a magnitude corresponding to the amount of said current.

7. The transmitter of claim 3 wherein said means for producing a variable duration current pulse includes a phase-shifter, said phase shifter comprising a bridge rectifier circuit, a capacitor having one end thereof connected to a first junction of said bridge circuit, a source of alternating current connected to the other end of said capacitor and to a second junction of the bridge opposite from said first junction, a source of direct current supply voltage connected to a third junction of the bridge, means for supplying a direct current control voltage to a fourth junction of the bridge opposite said third junction to prebias the conduction points of the rectifiers of said bridge and thereby control the charging rate of current through said capacitor, means connected to a junction of the bridge for producing an output signal corresponding to the charging of said capacitor, and means responsive to said output signal for producing a substantially square wave signal shifted in phase from said alternating current signal by an amount corresponding to the capacitor charging rate.

8. The transmitter of claim 1 in which said power supply means comprises a switching transistor connected between each of two junctions in a four-junction circuit to form a bridge-type circuit, a load connected between first and second junctions of the bridge circuit which are opposite each other, means for controlling the conduction of said transistors so that two of said transistors are conducting at substantially all times, current flowing through said load when the transistors forming diagonally opposing arms of the bridge are conducting.

9. The transmitter of claim 8 wherein said means for controlling the switching of said transistors comprises means for producing a pair of signals for application one to each transistor of a pair, and means for shifting the phase of said signals relative to each other to control the conduction times of the pair of transistors to which the signals are applied.

10. The transmitter of claim 1 further comprising means responsive to the power supplied to said transducer to reduce the amount of power supplied from said supply means to said transducer in response to an overload condition.

11. The transmitter of claim 3 further comprising means responsive to the power supplied to said transducer to reduce the amount of power supplied from said supply means to said transducer in response to an overload condition by reducing the duration of said pulse.

12. The transmitter of claim 1 further comprising means responsive to received reflected power to said transducer and said control signal to change the phase of the power supplied to said transducer to counteract the received reflected power.

13. The transmitter of claim 12 further comprising means for rectifying received reflected power, and means for storing the rectified power.

14. A transmitter as in claim 1 further comprising means for measuring the phase difference between the power supplied to said transducer and said control signal, and means responsive to the measured phase difference for bringing the power supplied to said transducer closer into phase with the phase of the control signal.

15. A transmitter as in claim 14 wherein said means for measuring the phase difference comprises means for comparing the phase of said control signal and the power supplied to said transducer and for producing a first signal representative of the difference measured by the comparison, and means responsive to said first signal for sifting the phase of the power produced by the supply means which is supplied to said transducer.

16. A transmitter as in claim 1 wherein said control circuit means comprises means for sensing the quantity of current at the input of said means for supplying power to the transducer means.

17. A sonar transmitter comprising transducer means, means for producing a control signal containing information of the phase of the power to be supplied to said transducer,
means responsive to said control signal to supply power to said transducer,
and control means responsive to the phase of the power supplied to said transducer for bringing the power supplied to said transducer into a predetermined phase relationship with said control signal.

18. The transmitter of claim 17 wherein said control means comprises phase discriminator means, said phase discriminator means including means for receiving said control signal and a signal corresponding to the power supplied to said transducer and for producing an error signal corresponding to the phase difference between said two signals, and phase shifter means connected between the source of control signals and the power supply means responsive to said error signal to bring the control signal into said predetermined phase relationship with the power applied to the transducer.

19. The transmitter of claim 18 wherein said phase shifter comprises a bridge rectifier circuit, a capacitor having one end thereof connected to a first junction of said bridge circuit, a source of alternating current connected to the other end of said capacitor and to a second junction of the bridge opposite from said first junction, a source of direct current supply voltage connected to a third junction of the bridge, means for supplying a direct current control voltage to a fourth junction of the bridge opposite said third junction to prebias the conduction points of the rectifiers of said bridge and thereby control the charging rate of current through said capacitor, means connected to a junction of the bridge for producing an output signal corresponding to the charging of said capacitor, and means responsive to said output signal for producing a substantially square wave signal shifted in phase from said alternating current signal by an amount corresponding to the capacitor charging rate, said control signal comprising the alternating current signal applied to the phase shifter and said error signal from said phase discriminator comprising the direct current control signal to prebias the rectifiers of the bridge.

20. A sonar transmitter comprising transducer means, means for producing a control signal containing information of the phase and quantity of power to be supplied to said transducer,
means responsive to said control signal to supply power to said transducer,
means responsive to the amount of power supplied to said transducer and to the control signal to control said power supply means to adjust the amount of power supplied to said transducer,
and control means responsive to the phase of the power supplied to said transducer for bringing the power supplied to said transducer into a predetermined phase relationship with said control signal.

21. The transmitter of claim 20 in which said power supply means includes means for producing a variable duration pulse of current, said last-named means including means to control the duration of said pulse to adjust the power supplied to said transducer.

22. The transmitter of claim 21 wherein said variable duration current pulse-producing means includes a plurality of switching means, said means for controlling the duration of the current pulse comprises means for controlling the current conduction time of selected ones of said switching means.

23. The combination of claim 22 wherein said means for controlling the current conduction time of said switching means comprises first means responsive to said control signal for supplying a pair of signals to a selected pair of said switching means to produce a current pulse for the transducer, said first means including phase shifter means to shift the phase of said pair of signals relative to each other to control the duration of the conduction time of said selected pair of switching means.

24. The combination of claim 23 wherein the phase shifter means controlled by the phase discriminator circuit is connected between the source of control signals and the phase shifter means for shifting the phase of the pair of signals.

25. The combination of claim 23 wherein said power supply means comprises a switching transistor connected between each of two junctions in a four-junction circuit to form a bridge-type circuit, a load connected between first and second junction of the bridge circuit which are opposite each other, means for controlling the conduction of said transistors so that two of said transistors are conducting at substantially all times, current flowing through said load when the transistors forming diagonally opposing arms of the bridge are conducting.

26. The combination of claim 25 wherein said means for controlling the switching of said transistors comprises means for producing a pair of signals for application one to each transistor of a pair, said phase shifter means for controlling the duration of the power supply energy output shifting the phase of said pair of signals relative to one another to control the conduction times of the pair of transistors to which the signals are applied.

* * * * *

UNITED STATES PATENT OFFICE
CERTIFICATE OF CORRECTION

Patent No. 3,622,960  Dated November 23, 1971

Inventor(s) BENJAMIN BARRON

It is certified that error appears in the above-identified patent and that said Letters Patent are hereby corrected as shown below:

Col. 8, line 73, insert -- is -- after "Isolation"

Col. 9, line 30, after "50.", delete "inductors" and insert -- The --

Col. 8, line 41, delete "Tee" and insert -- The --

Signed and sealed this 17th day of September 1974.

(SEAL)
Attest:

McCOY M. GIBSON JR.
Attesting Officer

C. MARSHALL DANN
Commissioner of Patents